United States Patent [19]

Melgaard

[11] Patent Number: 4,617,955
[45] Date of Patent: Oct. 21, 1986

[54] STOP OR SWITCH VALVE FOR FLUIDS
[75] Inventor: Oluf Melgaard, Odder, Denmark
[73] Assignee: BM Digiflow A/S, Odder, Denmark
[21] Appl. No.: 638,486
[22] PCT Filed: Nov. 28, 1983
[86] PCT No.: PCT/DK83/00111
  § 371 Date: Jul. 30, 1984
  § 102(e) Date: Jul. 30, 1984
[87] PCT Pub. No.: WO84/02169
  PCT Pub. Date: Jun. 7, 1984

[30] Foreign Application Priority Data

Nov. 29, 1982 [DK] Denmark .............................. 5294/82

[51] Int. Cl.⁴ ........................ B08B 9/02; F16K 51/00; F16K 1/44
[52] U.S. Cl. .................................. 137/240; 137/312; 137/614.17; 137/614.18; 137/614.19
[58] Field of Search ........... 137/238, 240, 312, 614.17, 137/614.18, 614.19, 614.11

[56] References Cited

U.S. PATENT DOCUMENTS

| | | | |
|---|---|---|---|
| 4,304,251 | 12/1981 | Schädel et al. | 137/240 |
| 4,368,753 | 1/1983 | Brakelmann et al. | 137/240 |
| 4,373,545 | 2/1983 | Knappe | 137/240 |
| 4,436,106 | 3/1984 | Tuchenhagen et al. | 137/312 |
| 4,460,014 | 7/1984 | Mases et al. | 137/240 |
| 4,461,318 | 7/1984 | Brakelmann | 137/312 |

FOREIGN PATENT DOCUMENTS 2076116 11/1981 United Kingdom ................ 137/240

Primary Examiner—George L. Walton
Attorney, Agent, or Firm—Antonelli, Terry & Wands

[57] ABSTRACT

In a stop or switch valve of the type having a valve head (76,78) mounted on a reciprocable valve rod (86) the bushing member (30) as guiding the valve rod is provided with a cylindrical recess (48), through which a cleansing or sterilizing medium is brought to flow for counteracting contamination of the valve liquid when the valve head is switched into a position, in which the previously retracted valve rod portion (86, 74) is reintroduced into the valve chamber (4,6) as holding or conducting the valve liquid. The recess (48) is flow connected with further recesses or channels (52, 106) as provided adjacent the outside of such sealing rings, which seal various other valve chamber wall portions (30, 76 88), whereby the recess or channel systems can be included in a leakage supervision arrangement.

8 Claims, 6 Drawing Figures

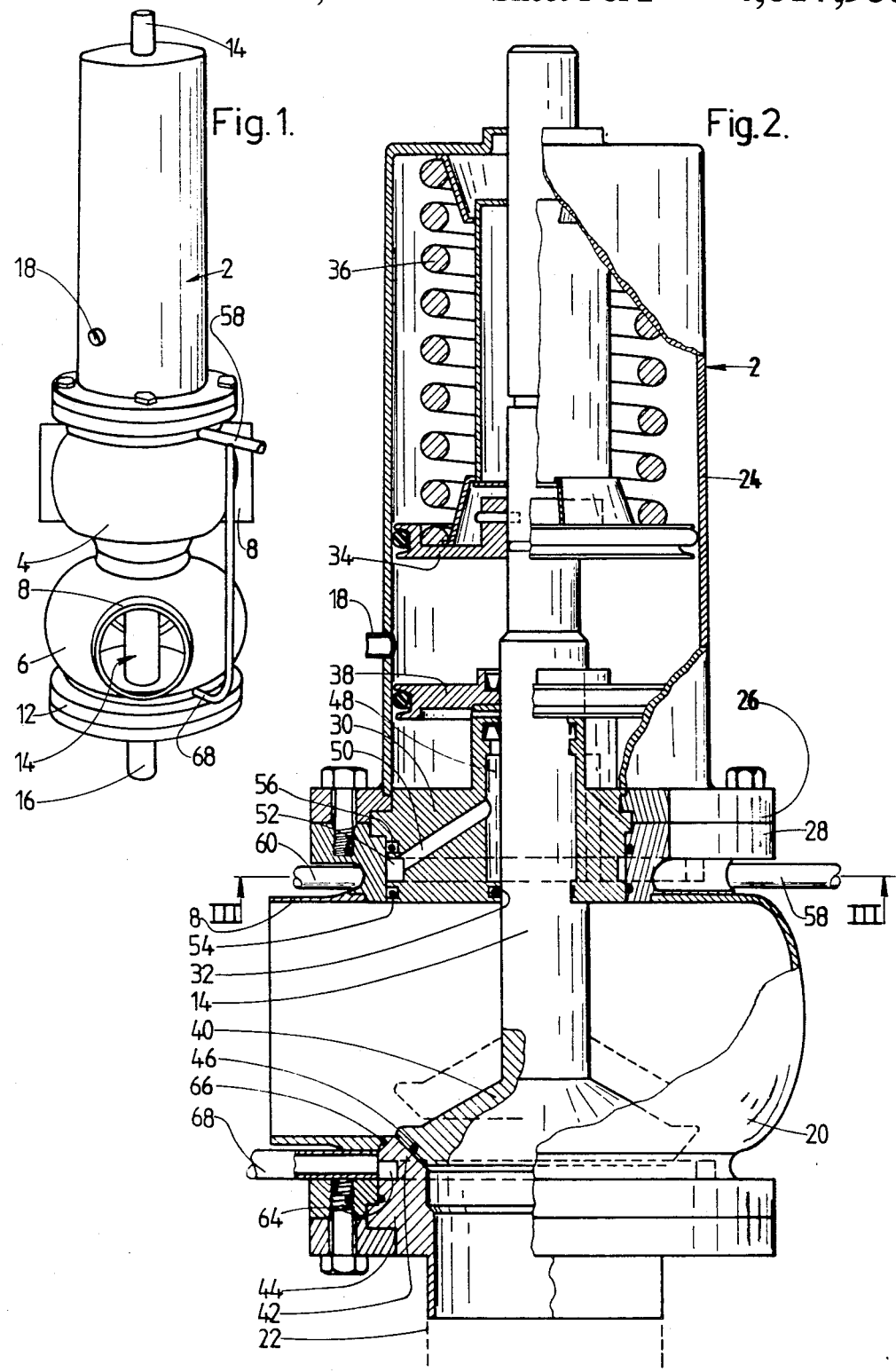

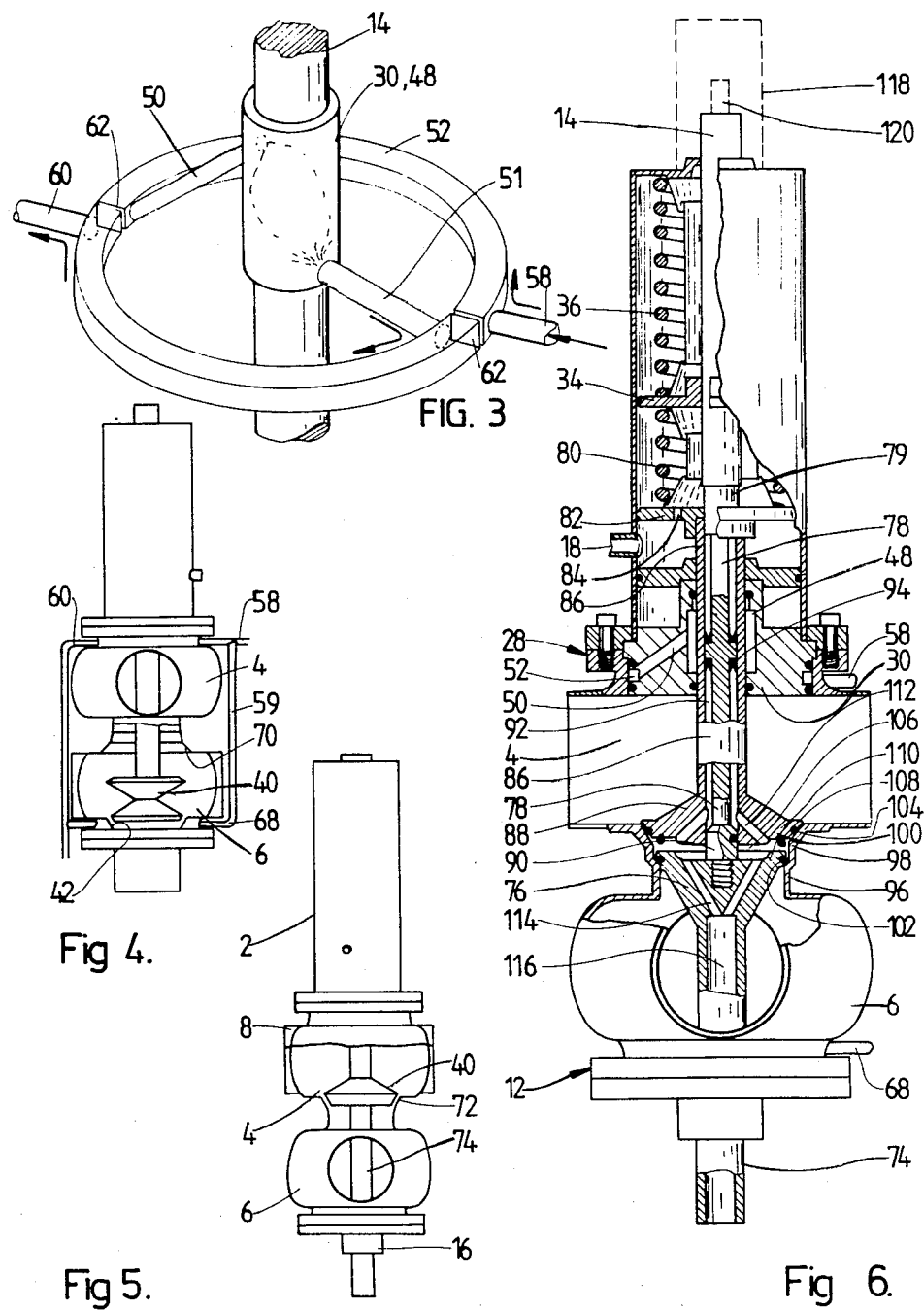

STOP OR SWITCH VALVE FOR FLUIDS

The present invention relates to a switch valve for fluids, with the switch valve including a valve chamber having an inlet, outlet or throughlet chamber having, in a wall portion thereof, a valve seat opening communicating with a branch conduit, and a valve head for opening and closing the valve seat opening by a respective displacement movement away from or towards the valve seat opening, and with the valve head being connected with a guiding or driving rod member axially reciprocal through a sealed opening in an opposite wall portion of the valve chamber, such that the rod member traverses the valve chamber and is thus exposed to the fluid therein.

Valves of the aforementioned type are used extensively in the chemical industry, in dairies, and other undertakings handling consumable liquids. The switch valves are useable, for example, for causing a battery of liquid tanks to be selectively connectable with a plurality of pipes connected with various liquid sources or receivers, such that, for example, at one time, some tanks are being filled with one liquid while others are being emptied for the same or another liquid, while still other tanks are being cleansed by a cleaning liquid.

With the use of the aforementioned switch valves, the tanks of a tank battery may be connected with the various liquid sources or receivers through a relatively low number of pipes and valves, but it is an associated condition that the switch valves are extremely effective with respect to the required separation between different liquids as passing through the respective valve chambers when the valve connection therebetween is closed.

In the handling of many chemical and consumable liquids it is even important that the switch valves by the very switch operation thereof do not give rise to any significant supply of "rest liquid" from the former operation to the new liquid flow conditions of the valve, and it is particularly important that a valve having connected a tank with a cleansing medium does not, by the switching thereof, cause any significant amount of cleansing liquid to be mixed into the new liquid to be supplied to the tank.

Similarly it is generally important that the switch over of a valve gives rise to the smallest possible contamination of the new liquid as now flowing through the valve, even upon a flow-through cleansing of the valve chamber, whereby "contamination" refers to both chemical and bacteriological contamination.

It is a primary purpose of the invention to provide a valve of the type referred to, which, in the switch over situation, is particularly non-contaminating to the liquid.

In accordance with advantageous features of the present invention, a stationary bushing is arranged closely outside of the sealed opening around the rod member, with the stationary bushing having an interior annular recess opening inwardly toward an outer surface of the rod member and communicating with a channel means for supplying the recess with a medium such as a cleansing or sterilizing medium. The annular recess has an axial length at least approximately corresponding to the valve head displacement between the open and closed positions thereof. The invention is based on the recognition that a possible source of contamination in the switch over situations is the surface of the control or guiding rod of the valve head, because such rods are reciprocated between positions inside and outside the valve chambers, whereby each rod will be reintroduced into its valve chamber still carrying on its surface a certain rest of the liquid as was present in the chamber when the rod was previously retracted therefrom. In the meantime the same surface material may well have been pronounced contaminated by bacteriological reactions outside the valve chamber. It will be appreciated, however, that such contamination is now practically avoidable, because the rods as retracted from the valve chambers may be washed or sterilized by means of a suitable fluid as supplied to the said recesses about the rods.

The invention almost naturally connects itself with another and well known safety measure, that is, the possibility of supervising the efficiency of the sealing means of the valve chamber wall as sealing against the valve head rod. A small draining chamber may be arranged just outside the sealing area, and an observed outlet from this chamber will be indicative of the sealing means having to be repaired. It will be appreciated that the discussed recesses according to the invention, in addition to their primary function, may even be utilized for such leakage inspection. They are even usable for still a further purpose, that is, for holding an applied desired over- or underpressure on the outer side of the rod sealing means as opposed to the inner side, which is subjected to the pressure inside the valve chamber.

In valves of preferred designs according to the invention, therefore, the recesses are channel connected with such cavities, which shall perhaps not require cleaning or sterilization, but which are wanted to be included in the leakage supervising system and/or a pressurized system.

It should here be briefly mentioned that in a special and widely used valve type the valve head cooperates with a valve seat between two chambers, which may be flow-through chambers for respective different liquids, whereby it is important that the leakage supervising system be extended to include the sealing means of the valve head itself. Therefore, an outwardly open annular drain chamber is arranged between parallel sealing ring means on the valve head, and the drain chamber is supplied with cleansing liquid through a channel in the valve head rod, the liquid led away through a channel in an opposed valve head guiding rod. Any leakage of the sealing means will reveal itself by "contamination", e.g. discoloring, of the cleansing liquid. The invention is extremely well suited for this type of valves, because the cleansing liquid may be supplied from the recess direct through a channel side opening of the valve rod as communicating with the recess, and a similar arrangement may be provided in connection with the opposed guiding rod. Hereby an effective flow through the recesses will be established in a simple suitable manner.

The invention, as described below, even provides for an important improvement of the said valve head as having an annular drain chamber.

In the following the invention is described in more detail with reference to the drawing, in which FIG. 1 is a perspective view of a valve according to the invention, FIG. 2 is a vertical sectional view of a valve similar to the valve of FIG. 1, FIG. 3 is a schematic view of a detail thereof, FIGS. 4 and 5 are side views of modified valves according to the invention, and FIG. 6 is a detailed sectional view of the valve illustrated in FIG. 5.

The valve as shown in FIG. 1 is of a generally known layout, comprising an upper actuator part 2 and a lower valve chamber system, depicted as two superimposed chambers 4, 6 each provided with connector stubs 8. The two chambers 4, 6 are interconnected through a neck portion 10, and the lower chamber 6 is closed at a bottom thereof by a flange structure 12. The interior of the neck portion 10 constitutes a valve seat for a valve head (not shown) as mounted on a valve rod 14, which is vertically reciprocable by the actuator part 2, whereby the flow connection between the chambers 4, 6 can be opened and closed. The lower end of the valve rod 14 is guided in an outer bushing 16.

The actuator part 2 is a cylinder including a spring loaded piston for moving the valve rod 14 in response to a pressure medium being supplied or discharged through a connector stub 18.

The valve chamber system may be designed in many different ways, as it should not necessarily include two valve chambers.

As shown in FIG. 2, the actuator part 2 cooperates with but a single valve chamber 20 as provided with but a single connector stub 8, though more such stubs could be provided, while a lower valve seat portion of this chamber is openable towards an outlet or inlet pipe 22 rather than towards another valve chamber. Thus, FIG. 2 shows a stop valve rather than a switch valve. However, FIG. 2 illustrates in more detail both the basic construction and several of the features of the invention.

More particularly, the actuator part 2 comprises an outer cylinder 24 having a bottom flange 26 for connection with a standard top flange 28 of the underlying valve chamber unit 20. Inside these flange portions 26,28 is arranged a block member 30 having a central passage for the valve rod 14, with a sealing ring 32 located closely adjacent the top side of the chamber 20. To the valve rod 14 is rigidly secured a piston 34, which is urged downwardly by a spring 36 located topwise in the cylinder 24. The block member 30 is sealed against the cylinder 24 by a stationary piston like element 38. The connector stub 18 is arranged between the piston members 34, 38, and when a pressure medium such as compressed air is introduced through the stub 18, the piston 34 will be caused to move upwardly, thus moving the valve rod 14 upwardly, against the action of the compression spring 36.

At its lower end the valve rod 14 is provided with a valve head 40 cooperating with an annular valve seat 42 in a block member 44 defining the relevant mouth portion of the lower branch pipe 22. The valve head 40 has a sealing ring 46 cooperating with the conical seat surface 42. It is readily understood that the valve seat 42 will be opened by retraction of the valve head 40 when compressed air is admitted to the cylinder 24 through the stub 18, while the spring 36 serves to close the valve seat 44 when the control air pressure is relieved.

It is a primary feature of the invention that the central passage of the block member 30 is of a relative large axial length and is shaped with an interior cylindrical cavity or recess 48, which is open towards the outside of the valve rod 14 and is connected, e.g. through a radial channel 50, with exterior pipe means for supplying a cleansing or sterilizing medium to the recess 48.

It will be appreciated that once such a medium is supplied to the recess 48, the outside of the valve rod 14 will be cleansed or sterilized not only when the valve is closed, but also when the valve head 40 is retracted from the valve seat 44, e.g. as shown in dotted lines. When the valve is thereafter closed, the valve rod portion as hereby reintroduced into the valve chamber 20 will thus be newly cleansed or sterilized, whereby it will be unable to cause the liquid in the valve chamber 20 to be contaminated.

In the preferred construction shown in FIG. 2, the cleansing or sterilizing medium is supplied to the recess 48 via a channel 50, which is branched off from an outer annular groove 52 in the block member 30, this groove being located between sealing rings 54, 56, with which the block member 30 engages a wide central opening of the upper valve chamber flange 28. The medium is supplied to the annular recess 52 through an exterior pipe 58 as also shown in FIG. 1, and it is discharged through another radial channel 51 and a pipe 60 as shown in more detail in FIG. 3.

In the groove 52 is arranged a pair of opposite tightening members 62, adjacent opposed sides of each of which the respective opposed pipes 58,60 and radial channels 50, 51 are connected with the groove 52, whereby, as shown by arrows, the inlet fluid will flow first about 180° through the groove 52 and then diagonally through the channels 50 and the recess 48, and finally through the remaining about 180° of the groove 52. As shown in FIG. 3, it is thus possible to secure an oriented flow through both the groove 52 and the recess 48. The medium may be hot steam under a suitable pressure. The collection of condensed water in the recess is counteracted by the outlet channel 51 leaving the recess through a bottom thereof.

Any leakage of liquid from the valve chamber 20 through the sealing rings 32, 54 will reveal itself by inspection of the output product from the pipe 60.

The lower valve seat block 44 is provided with a peripheral groove 64 as corresponding to the groove 52, the groove 64 being located just outside a sealing ring 66 towards the valve chamber 20 and being connected with a medium inlet pipe 68 and a similar outlet pipe (not shown), such that the medium is forced to pass along the groove by a suitably modified arrangement compared to FIG. 3.

As shown in FIG. 1, the upper medium inlet pipe 58 may be connected in parallel with the lower inlet pipe 68. The outlets, of course, may be correspondingly interconnected, or the upper and lower system may be connected in series, if permitted by the operational conditions such as undesired steam condensation towards the outlet end.

FIG. 4 shows an embodiment, in which the valve head 40 is a double acting head operating in the lower valve chamber 6 so as to be shiftable between a lower outlet valve seat 42 or an upper valve seat 70 in the connector neck portion 10.

In FIG. 5, the valve head 40 cooperates with an upper valve seat 72 in the connector neck portion so as to be upwardly retractable therefrom. The downwardly projecting guiding rod portion of the valve rod 14 is here designated 74. A valve of this design is shown in more detail in FIG. 6, in which several reference numerals designate similar parts as in FIG. 2.

In FIG. 6, the valve head 40 consists of a lower part 76, which, through a central rod 78, is rigidly connected with the upper valve rod actuator piston 34. Underneath this piston and biased therefrom by a compression spring 80 is arranged an additional piston plate 82, which is provided with a hole 84 and is slidable on a portion 79 of the rod 78. The hub portion of the piston plate 82 is secured to a hollow rod 86 projecting downwardly about the central rod 78 and having at its lower end an upper valve head part 88 located just above the head part 76. The lower portion of the central rod 78 is of reduced diameter, except for a lowermost rod portion 90, which is slidingly held in the lower end of the central bore of the hollow rod 86 and is secured to the lower valve head part 76. The reduced diameter gives rise to a cylindrical channel 92 between the central and the hollow rod, this channel projecting axially from the lower slide rod portion 90 up to a level above the bottom end of the cylindrical recess 48 as encircling the outside of the valve rod, here the hollow rod 86.

Just above the bottom of the recess 48 the wall of the hollow rod 86 is provided with a radial hole 94, such that the recess 48 may communicate with the cylindrical channel 92, also when the valve rods are displaced upwardly from their lowermost positions as shown in FIG. 6.

The upper spring 36, through the central rod 79,78, forces the lower head part 76 down against an annular valve seat 96, which is extended upwardly through a cylindrical or only slightly conical portion 98, which continues in a pronounced conical seat portion 100. The upper head part 88 is forced against this seat portion 100 by the hollow rod 86 being downwardly biased by the combined pressure of the actuator springs 36, 80 as acting on the piston plate 82. The head parts 76, 88 are provided with circumferential sealing rings, 102, 104, respectively, for cooperation with the said seat portions. In the closed position as shown, the two head parts are spaced from each other, thus confining a chamber 106 between them. In the underside of the upper head part 88 is mounted an annular sealing ring 108 as engageable by an annular top surface portion 110 of the lower head part 76.

And its lower end the cylindrical channel 92 between the valve rods is closed by the rod portion 90, but from an area well spaced above this portion a few inclined channels 112 are branched off from the inside of the hollow valve rod 86, these channels leading to the underside of the valve head 88 inside the annular sealing ring 108. Correspondingly, one or more inclined channels 114 are provided in the lower head part 76, these channels leading to a downwardly open bore 116 in the lower valve guiding rod 74.

In operation, the medium as supplied to the recess 48 will pass from the recess 48 through the hole 94 into the cylindrical channel 92 and through the channels 112 to the chamber 106 between the sealing rings 102, 104, whereafter the medium is discharged through the channels 114 and the bore 116. In the lower flange assembly 12, as in FIG. 1, a rod surface cleaning and leak supervising system is arranged, corresponding almost exactly to the system of or in the block 30 topwise of the valve chamber 20 of FIG. 2, whereby the relevant outer portion of the hollow valve guiding rod 74 is maintained clean or sterilized preparatory to its being drawn into the lower valve chamber 6 when the valve head structure 76,88 is raised from the seat portions 96,98,100.

As long as the valve head parts remain seated the chamber 106 between the valve head parts will receive any such liquid, which may happen to leak across any of the sealing rings 102 and 104, and the leakage supervision is thus extended to the valve head 76,88, inasfar as process liquid happening to be present in the outflow from the lower valve guiding rod 74 may, of course, refer to a leakage in the top sealing system of the upper valve chamber 4. However, any sign of a leakage will be indicative of the particular valve having to be more closely examined and repaired.

In addition to the possible leakage supervision the throughflow of a cleansing or sterilizing medium through the valve head chamber 106 will serve to clean or keep clean the valve seat surface between the sealing rings 102 and 108, whereby this surface area will not be quilty of contaminating the process liquid when the valve head 76,88 is later retracted from the valve seat. Additionally, the medium such as for example steam, may even here be supplied at an overpressure as counteracting any leakage tendency from the valve chambers 4 and 6.

When compressed air or another pressure fluid is admitted through the stub 18 for causing the valve head structure 76,88 to be lifted from the valve seat region the pressure as transmitted through the hole 84 in the piston plate 82 will cause the upper piston 34 and therewith the central valve rod 78 to move upwardly against the action of the spring 36, whereby the lower valve head part 76 is urged upwardly against the underside of the upper head part 88. Thus, by the further raising action the spring 80 will expand slightly and cause the two valve head parts to be forced firmly together, whereafter both head parts will be raised further with the sealing ring 108 engaged by the top surface 110 of the lower head part 76, whereby the chamber 106 between the head parts will be closed outwardly even before the upper valve head part 88 leaves its seat 110.

This automatic preclosing of the chamber 106 is highly important, because it will prevent the interior cleansing or sterilizing medium in the chamber 106 from being mixed into the process liquid in any of the valve chambers 4 or 6, or, invertedly, process liquid from entering the chamber 106, when the valve is opened between these chambers. This pronounced advantage is due to the lower valve head part 76 first being moved upwardly through the cylindric or very slightly conical seat portion 98, whereby it maintains an effective sealing against the valve seat until it is lifted far enough to contact the sealing ring 108 of the upper head part to thereby close the chamber 106 before or concurrently with the outer sealing rings 102,104 leaving the cylindrical seat portion 98 and the conical seat 100, respectively. The chamber 106, of course, remains sealingly closed whenever the valve head assumes its raised position, and by relowering of the valve head the chamber 106 is not reopened until both head parts 76 and 88 have sealingly engaged their respective seats so as to again prevent undesirable liquid flow to or from the chamber 106.

In the raised position of the valve head and valve rods 78, 86, the radial hole 94 will still communicate with the cylindrical recess 48, and the chamber 106 is still open internally for conducting the cleansing or multiple purpose medium from the recess 48 to the lower outlet through the bore 116.

It should be emphasized that the described valve head unit 76,88 will be usable with the described advantages even in leakage supervising systems, in which there are no recesses 48 or other valve rod cleaning or sterilizing arrangements.

Topwise in FIG. 6 is shown, in dotted lines, a casing 118 over the top end of the valve rod, this casing containing sensor means for the position of the valve rod as well known in the art. However, the central valve rod has an upper extension 120, and special sensor means (not shown) are provided in the casing or on the top portion 14 of the hollow valve rod 86 so as to sense the mutual position of the elements 14 and 120, thus providing a sensing signal referring to the valve head chamber 106 being open or fully closed.

It will be appreciated that the valves according to FIGS. 2 and 6 are designed in such a manner that the actuator units 2 with associated valve rods and heads are easily removable from the valve chamber systems, such that, with the use of superimposed valve chambers 4, 6, these chambers need not be separable from each other, i.e. they may be welded together somewhere in the neck portion 10. Thus, even the external medium pipes 58, 68 (FIGS. 1 and 4) may be rigidly connected with each other through a pipe 59.

In the foregoing the valvs have been described with vertical orientation, but this in no way a necessary condition.

I claim:

1. A stop or switch valve for fluids, the valve comprising a valve chamber including an inlet, outlet or throughlet chamber having in a wall portion thereof, a valve seat opening communicating with a branch conduit, and a valve head for opening and closing said valve seat opening by a respective displacement movement away from or towards the valve seat opening, the valve head being connected with a guiding or driving rod member axially reciprocated through a sealing opening in an opposite wall portion of said valve chamber, such that the rod member traverses the valve chamber and is thus exposed to the fluid therein, characterized in that a stationary bushing is arranged for closing and sealing said chamber and surrounds the rod member, the stationary bushing having an interior annular recess opening inwardly towards an outer surface of the rod member and communicating with channel means for supplying the recess with a medium such as a cleansing or sterilizing medium for cleaning the outer surface of the rod member in all positions of the valve head to prevent the fluid in said chamber from becoming contaminated as a result of the rod member reciprocating back and forth into said chamber, said annular recess having an axial length at least roughly corresponding to the valve head displacement between open and closed positions thereof.

2. A valve according to claim 1, in which the rod member is a valve head driving member associated with exterior control means for displacing the rod member so as to open and close the said valve seat opening.

3. A valve according to one of claim 1 or 2, in which the rod member is a passive guiding member projecting from the valve head independently of a for causing valve head displacement.

4. A valve according to claim 1, in which the recess is provided in a wall of a central rod guiding bore in a block member axially inserted into an opening of the valve chamber and circumferentially sealed thereagainst by a sealing ring, the recess being connected with an annular channel provided along a circumference of said block member axially outside said sealing ring.

5. A valve according to one of claims 1 or 4, in which a valve seat opening is provided in a cylindrical block axially inserted in an opening in the wall of the valve chamber and sealed thereagainst by a sealing ring, an annular channel connected to a leakage supervising medium flow system being provided along a circumference of the block axially outside the sealing ring.

6. A valve according to one of claims 1 or 4, in which the annular recess is provided with inlet and outlet conduits, of which the outlet conduit is located in a bottom level of the recess.

7. A valve according to claim 1, in which an outlet from the recess includes radial hole means in wall of a tubular valve head rod, through which the outlet medium is delivered to a leakage chamber in the valve head and further to an outlet channel in a valve head rod on the other side of the valve head.

8. A valve according to claim 7, in which the valve head comprises two head parts respectively connected with valve head rods extending coaxially into an actuator unit, in which means are provided for displacing the coaxial valve rods as a whole and additionally for mutually displacing the rods to enable the valve head parts to be separated in the closed position for forming between them the leakage chamber, while the valve head parts when retracted from the valve seat are forced together for holding the leakage chamber circumferentially closed, and wherein the valve seat is generally divergingly conical towards the valve restriction side thereof, a first of said head parts cooperating with the narrower end of the seat while the other head part cooperated with the broader end of the seat, said seat having an intermediate portion of cylindrical or only slightly conical shape, such that by initial retraction of the first head part the sealing means thereof will maintain a sealing engagement with the intermediate seat portion at least until it sealingly engages the other head part for further combined retraction of the head parts.

* * * * *